United States Patent
Dawkins et al.

(10) Patent No.: US 7,038,007 B2
(45) Date of Patent: May 2, 2006

(54) PROCESS FOR A CONTINUOUS POLYMERIZATION FOR THE PRODUCTION OF HIGH MOLECULAR WEIGHT POLYBENZIMIDAZOLE

(75) Inventors: Bobby G. Dawkins, Charlotte, NC (US); J. Dean Baker, Rock Hill, SC (US); Rita H. Joiner, Rock Hill, SC (US)

(73) Assignee: PBI Performance Products, Inc., Charlotte, NC (US)

( * ) Notice: Subject to any disclaimer, the term of this patent is extended or adjusted under 35 U.S.C. 154(b) by 0 days.

(21) Appl. No.: 10/884,099

(22) Filed: Jul. 2, 2004

(65) Prior Publication Data

US 2006/0004181 A1    Jan. 5, 2006

(51) Int. Cl.
*C08G 73/18*    (2006.01)
*C08G 69/00*    (2006.01)
*C08F 2/00*    (2006.01)

(52) U.S. Cl. .................. 528/327; 528/310; 528/335; 528/336; 528/337; 528/339; 528/340; 528/342; 528/348; 528/353

(58) Field of Classification Search .............. 528/310, 528/327, 335–337, 339, 340, 342, 348, 353
See application file for complete search history.

(56) References Cited

U.S. PATENT DOCUMENTS

| 3,509,108 | A | | 4/1970 | Prince |
| 4,312,976 | A | | 1/1982 | Choe |
| 4,588,808 | A | * | 5/1986 | Ward ........................ 528/337 |
| 4,672,104 | A | | 6/1987 | Ward |
| 2006/0004181 | A1 | * | 1/2006 | Dawkins et al. ............ 528/327 |
| 2006/0004182 | A1 | * | 1/2006 | Dawkins et al. ............ 528/327 |

* cited by examiner

*Primary Examiner*—P. Hampton Hightower
(74) *Attorney, Agent, or Firm*—Hammer & Hanf, P.C.

(57) ABSTRACT

A process for a single-stage melt polymerization for the production of a high molecular weight polybenzimidazole which comprises the steps of: providing a reaction vessel having a means for agitation and a means for vacuum; charging the reaction vessel with reactants selected from: (A) a tetraaminiobiphenyl (TAB), and (B) a diphenyl isophthalate (DPIP); reacting the reactants under constant agitation and under a vacuum with an inert gas sweep; maintaining a reactant temperature which does not exceed 290° C. under constant agitation allowing pressure in the vessel to increase, with an inert gas sweep until a phase change is achieved, when the temperature reaches 250° C. pressure is increased to a slight positive pressure; and increase the reactant temperature and pressure within said reaction vessel while maintaining constant agitation and inert gas sweep, while maintaining a slight positive pressure. Preferably the vessel used in the instant invention is a high intensity reaction vessel.

20 Claims, No Drawings

PROCESS FOR A CONTINUOUS POLYMERIZATION FOR THE PRODUCTION OF HIGH MOLECULAR WEIGHT POLYBENZIMIDAZOLE

BACKGROUND OF THE INVENTION

The present invention provides a process for producing PBI polymer with continuous polymerization with agitation throughout the melt to solid phase change, thus a single-stage process as opposed to the standard two-stage solid-state polymerization "SSP" process. A single-stage process would be beneficial to the commercial process since the current reactors are sized to be large enough to account for the high degree of foam state observed during the first stage of the current reaction process.

Single-stage polymerization of polybenzimidazole has been demonstrated before in U.S. Pat. Nos. 3,509,108 and 4,312,976. Prince's U.S. Pat. No. 3,509,108 claimed a one-stage polymerization process at elevated temperature 460–500° C. and high pressure to 500 psig. Choe's U.S. Pat. No. 4,312,976 claimed a single-stage melt polymerization process with TAB plus IPA (isophthalic, or a dicarboxylic acid) in the presence of a catalyst (up to 1% by wt.) to produce high molecular weight PBI polymer. The monomers are reacted at a temperature higher than their melting temperature, 340–450° C., at atmospheric pressure at least, to produce inherent viscosities of at least 0.5.

The high pressure taught in the Prince reference makes this process costly and difficult to run. Choe's reference eliminates the need for the high pressures taught by Prince but requires the addition of a catalyst. Consequently the commercial product has been made with a two-stage process as taught by Ward U.S. Pat. No. 4,672,104 for the production of polybenzimidazoles.

Inherent viscosity (hereinafter "IV") is the ratio of the specific viscosity of a solution of known concentration to the concentration of solute extrapolated to zero concentration, measured in units of dL/g. Inherent or intrinsic viscosity is also called the limiting viscosity number. It is directly proportional to the polymer-average molecular weight. dL/g, IV (inherent viscosity) measure, is based on the concentration of the polymer sample tested, g/100 ml or g/deciliter. The polymer is dissolved at the 0.4% (w/v) level in 100 ml of 96.5% (±0.5%) sulfuric acid at 80° C. After filtering, an aliquot is measured for IV using a calibrated Cannon-Fenske capillary viscometer in a 25±0.1 C water bath, the flow time (sec.) of the PBI polymer solution measured vs. the dissolving solvent. IV=1 n (t1/t2)/c, where the natural log of the flow time of the PBI solution (t1) over the flow time of the solvent (t2) is divided by the PBI solution concentration.

SUMMARY OF THE INVENTION

A process for a single-stage melt polymerization for the production of a high molecular weight polybenzimidazole which comprises the steps of: providing a reaction vessel having a means for agitation and a means for vacuum; charging the reaction vessel with reactants selected from: (A) a tetraaminiobiphenyl (TAB), and (B) a diphenyl isophthalate (DPIP); reacting the reactants under constant agitation and under a vacuum with an inert gas sweep; maintaining a reactant temperature which does not exceed 290° C. under constant agitation, allowing pressure in the vessel to increase, with an inert gas sweep until a phase change is achieved, when the temperature reaches 250° C. pressure is increased to a slight positive pressure; and reactant temperature is increased within said reaction vessel while maintaining constant agitation and inert gas sweep, while maintaining a slight positive pressure.

In this process for a single-stage melt polymerization for the production of polybenzimidazole the step of reacting the reactants under constant agitation and under a vacuum with an inert gas sweep is performed in the absence of either an organosilicon halide polymerization catalyst or a phosphorous containing polymerization catalyst or both an organosilicon halide polymerization catalyst and a phosphorous containing polymerization catalyst. Preferably the reaction vessel used in the instant invention is a high intensity reaction vessel.

DETAILED DESCRIPTION OF THE INVENTION

A process for a single-stage melt polymerization for the production of a high molecular weight polybenzimidazole which comprises the steps of: providing a reaction vessel having a means for agitation and a means for vacuum; charging the reaction vessel with reactants selected from: (A) a tetraaminiobiphenyl (TAB), preferably 3,3',4,4'-tetraaminobiphenyl, or similar/comparable aromatic and heteroaromatic tetra-amino compounds, and (B) a diphenyl isophthalate (DPIP), preferably 1,3-benzene dicarboxylic acid, diphenyl ester or similar/comparable aromatic dicarboxylic acid ester; reacting the reactants under constant agitation and under a vacuum with an inert gas sweep; maintaining a reactant temperature which does not exceed 290° C. under constant agitation, allowing pressure in the vessel to increase, with an inert gas sweep until a phase change is achieved, when the temperature reaches 250° C. pressure is increased to a slight positive pressure; and increasing the reactant temperature within said reaction vessel while maintaining constant agitation and inert gas sweep, while maintaining a slight positive pressure. The reaction vessel, after it is charged with the reactants, is initially placed under a vacuum of between 169 to 508 millibar (5 inches of mercury to 15 inches of mercury (12.7 to 38.1 cm Hg)) at between or equal to 20° to 25° degrees Centigrade. Once the reaction starts the pressure within the vessel starts to increase gradually. When the temperature within the reaction vessel reaches 250° C. pressure is increased to a slight positive pressure.

In this process for a single-stage melt polymerization for the production of polybenzimidazole the step of reacting the reactants under constant agitation and under a vacuum with an inert gas sweep is performed in the absence of either an organosilicon halide polymerization catalyst or a phosphorous containing polymerization catalyst or both an organosilicon halide polymerization catalyst and a phosphorous containing polymerization catalyst.

Preferably the reaction vessel used in the instant invention is a high intensity reaction vessel. A high intensity reaction vessel has a means for agitation, a means to control temperature and a means for controlling pressure or vacuum. What sets this vessel apart from the vessel used in the first stage of the reaction is the means for agitation tends to be more robust and is capable of agitating the ground prepolymer in a solid state, providing for a more homogeneous reaction and final product. These high intensity reactors include but are not limited to, rotary furnace, fluidized bed, static mixing, continuous kneader reactor, opposite rotating processor, same direction rotating processors and a single shaft rotating processor. These high intensity mixers can be obtained from various sources which include but are not limited to: Komax Systems Inc., Wilmington, Calif.; Koch-Glitsch, Wichita, Kans.; Carbolite, Watertown, Wis.; LIST, Charlotte, N.C.; Processall, Cinncinnati, Ohio; Procedyne Corp., New Brunswick, N.J.; agitated pressure autoclaves or glassware. Further, it is possible to convert a standard mixing vessel to a high intensity reaction vessel by changing the agitator blades to engage most of the mixture, using a larger or more powerful agitator motor, adding additional agitators, increasing the rotating speed (rpm), or combinations thereof.

A single-stage process would be beneficial to the commercial process since the current reactors are sized to be large enough to account for the high degree of foam state observed during the first stage of the current reaction process. If the foam state can be eliminated, the reaction vessel size could be reduced 10-fold to maintain the current production rates, or a larger monomer charge could be made per batch.

Compared to the two stage process taught in the Ward reference, a continuous, single-stage, single-step effectively eliminates the first stage of polymerization. As such, agitation was continuous throughout the melt (DPIP and TAB melt at ~135° C. and ~200° C., respectively) to solid phase change and through SSP, with no stop-cool-crush-temperature ramp process steps related to foaming. The reaction profiles demonstrated the reaction phase changes, and the typical phenol/water/prepolymer "foam" did not fully form.

Better polymer inherent viscosity and color results were achieved under slight positive pressure as opposed to vacuum, apparently due to air/oxygen exposure under the vacuum conditions. For purposes of the instant application the term slight positive pressure is between or equal to 0.1 millibar (mbar) to 500 mbar, or between 0.040 inches of $H_2O$ (0.10 cm) at 4 degrees Centigrade to 200.7 inches of $H_2O$ (509.8 cm). The Prince reference, U.S. Pat. No. 3,509,108 teaches a process where pressure is above 50 psi which is equal to 3447 mbar or 1,384 inches of water (3,515.4 cm) at 4 degrees centigrade. Preferred upper end of pressure range includes 300 mbar (120.4 inches of $H_2O$ (305.8 cm) at 4 degrees Centigrade), 150 mbar (60.2 inches of $H_2O$ (152.9 cm) at 4 degrees Centigrade), 100 mbar (40.1 inches of $H_2O$ (101.9 cm) at 4 degrees Centigrade), 60 mbar (24.1 inches of $H_2O$ (61.2 cm) at 4 degrees Centigrade) and 30 mbar (12.0 inches of $H_2O$ (30.5 cm) at 4 degrees Centigrade). The lower end of the preferred pressure range includes 0.5 mbar (0.201 inches of $H_2O$ (0.511 cm) at 4 degrees Centigrade), 1.0 mbar (0.40 inches of $H_2O$ (1.0 cm) at 4 degrees Centigrade), and 2.0 mbar (0.80 inches of $H_2O$ (2.0 cm) at 4 degrees Centigrade). The polymer inherent viscosity and color improved when the reaction was completed under slight positive pressure, even after the initial vacuum up to 290° C. plus the "hold" time, or at 290° C. "Hold" time is defined as processing time added early in the reaction sequence, after the typical first-stage reaction, to promote phenol condensate removal, but without negatively impacting the polymer reaction. Added processing time in the typical subsequent second-stage reaction, and at a higher temperature, could promote cross-linking, thus hindering IV or molecular weight growth. Polymer solubility and filtration quality would be positively impacted with the earlier "hold time", or via a single-stage process.

In this process for a single-stage melt polymerization for the production of high molecular weight polybenzimidazole, the reactants are kept under constant agitation with an inert gas sweep. The result is that the reaction does not produce any appreciable foam. In the commercial process it is common to produce foam which has a volume of ten times or more the volume of the initial reactants. For purposes of this application appreciable foam will be defined as foam which occupies at least five times the volume of the initial reactants. It has been found that when using a high intensity mixer under constant agitation that foam is still produced but it is usually only two to four times the volume of the initial reactants.

Inherent viscosity of the resulting high molecular weight polybenzimidazole polymer made by the single-stage melt polymerization process is in the range of 0.40 to 0.80 for particle sizes greater than or equal to 150 microns to less than or equal to 1000 microns. For this application we will define uniform inherent viscosity to be ±0.16 dL/g, preferably ±0.10 dL/g, more preferable ±0.08 dL/g for particle sizes greater than or equal to 150 microns to less than or equal to 1000 microns.

Using the process of the present invention a bright yellowish-gold colored final product polymer was obtained with a bulk inherent viscosity (IV) of 0.5, and IV range of 0.43–0.56 for particle sizes of greater than or equal to 150 microns to less than or equal to 1000 microns. The IV homogeneity for particles of less than 150 microns was 0.50–0.56. The product color was indicative of no significant oxidation or crosslinking. This result was obtained under the following process conditions: vacuum w/$N_2$ purge, 90-minute hold time at 290° C., and 2 hours vs. the typical longer reaction times and higher temperatures for the current commercial process.

The continuous single-stage process with high intensity mixing allows for completion of the melt first stage reaction earlier at 290° C., quickly converting the product to a powder product form, and subsequent better heat transfer (powder vs. foam) for driving the phenol/water condensate by-products, growing IV, and improving the efficiency and consistency of the overall reaction. Inherent viscosities were relatively consistent at 290° C., and consistent with typical commercial manufacturing plant values, 0.20–0.25 IV. IV's grew as the reaction temperature was increased beyond the 290° C. typical "hold" temperature, as well as with reaction duration at temperatures in the range of 335–343° C. The IV growth was consistent and continuous with temperature and duration, if exposures were eliminated. IV's tended to grow as the hold time was increased from 30 minutes to 165 minutes. Breaches of $N_2$ flow and air/$O_2$ exposure led to polymer product discoloration, lower IV's, insoluble polymer, most likely due to crosslinking and leading to thermal degradation. Improved IV growth rates and lower reaction times could be realized at typical commercial process temperatures in the range of 345–370 C.

EXAMPLES

Example A 3.5 lbs. (1.59 kg) of TAB and 5.2 lbs. (2.36 kg) of DPIP charged to a LIST CRP-10 Batch (12.2-li), twin shaft, vessel at ambient temperature, for a 40-50% fill level; vacuum of approx. −318 mbar g, agitator speed of 16 rpm, $N_2$ flow of 3 SCFH (standard cubic feet per hour) or 1.42 SLPM (standard liters per minute). The vessel was heated at an initial ramp of 195° C./hr and, at 277° C., the temperature was held for 90 minutes. After 90 minutes the temperature was increased to 343° C. at 120° C./hr, and the vessel was placed under pressure of 11 mbar g. The reaction time was 120 minutes after the product temperature reached 328° C. The vessel was allowed to cool overnight and the product was discharged. The product was tested for bulk IV and IV vs. particle size distribution. See Table 1 below.

TABLE 1

| Particle size | Tare | Fractions | Inher. Visc. | Distribution | |
|---|---|---|---|---|---|
| [μm] | [g] | [g] | [dL/g] | [g] | [%] |
| >1400 | 330.3 | 333.9 | 0.55590 | 3.6 | 7.2 |
| 1180–1400 | 321.5 | 323.9 | 0.51200 | 2.4 | 4.8 |
| 1000–1180 | 314.6 | 317.2 | 0.52590 | 2.6 | 5.2 |
| 710–1000 | 305.2 | 309.9 | 0.50900 | 4.7 | 9.4 |
| 425–710 | 278.8 | 285.8 | 0.57250 | 7.0 | 14.0 |
| 355–425 | 270.0 | 272.2 | 0.57100 | 2.2 | 4.4 |
| 300–355 | 272.5 | 274.6 | 0.64240 | 2.1 | 4.2 |
| 150–300 | 249.4 | 257.6 | 0.56020 | 8.2 | 16.4 |
| 0–150 | 327.1 | 344.2 | 0.48150 | 17.1 | 34.3 |
| Sum | | | | 49.9 | 100.0 |

Example 1

3.5 lbs. (1.59 kg) of TAB and 5.2 lbs. (2.36 kg) of DPIP were charged to the reaction vessel at ambient temperature; vacuum was pulled and held at 9 inches Hg (22.9 cm); agitator speed of 17 rpm; $N_2$ flow of 3 SCFH (standard cubic feet per hour) at standard temperature (0° C.) and pressure (1 atm) or 1.42 SLPM (standard liters per minute) or 1416 SCCM (standard cubic centimeters per minute). When the product temperature reached 285.5° C., a sample (yellow/gold in color) was taken, and temperature held there for 60 minutes. A sample (light brown color) was also taken after the 60-minute "hold" time. Vacuum was used until after the "hold" time, and pressure was applied at 3 inches $H_2O$ positive (7.6 cm $H_2O$). When the product temperature reached 327° C., a sample (darker brown) was taken after 2 hours, and after 3 hrs. 40 min. The polymer product was again sampled after the vessel cooled overnight. The reaction yielded 4.32 lbs. (1.96 kg) solid and 4.04 lbs. (1.83 kg) condensate. See Table 2 below.

TABLE 2

| Particle size | Tare | Fractions | Inher. Visc. | Distribution | |
|---|---|---|---|---|---|
| [μm] | [g] | [g] | [dL/g] | [g] | [%] |
| >1400 | 330.3 | 336.2 | 0.6207 | 5.9 | 11.8 |
| 1180–1400 | 321.5 | 323.8 | 0.5627 | 2.3 | 4.6 |
| 1000–1180 | 314.6 | 317.2 | 0.5276 | 2.6 | 5.2 |
| 710–1000 | 305.2 | 309.3 | 0.5889 | 4.1 | 8.2 |
| 425–710 | 278.8 | 285.2 | 0.5881 | 6.4 | 12.8 |
| 355–425 | 270.0 | 272.3 | 0.5761 | 2.3 | 4.6 |
| 300–355 | 272.5 | 274.6 | 0.5515 | 2.1 | 4.2 |
| 150–300 | 249.4 | 257.6 | 0.5652 | 8.2 | 16.4 |
| 0–150 | 327.1 | 343.2 | 0.4577 | 16.1 | 32.2 |
| | | | $\bar{x}$ = 0.5398 | Σ = 50.0 | Σ = 100.0 |

Example 2

Same monomer weights as above and same process conditions, except agitation was at 18 rpm. When the product temperature reached 286° C., switched to atmospheric pressure (2 inches $H_2O$ positive, 5.1 cm $H_2O$ positive), and held there for 165 minutes; samples were taken at the beginning (yellowish-gold color), after 60 min. (yellowish-gold) and after 165 min. (yellowish-gold). When the product temperature reached 327° C., sample was taken after 2 hours (brownish-gold color) and after 3 hrs. 25 min. The vessel was allowed to cool. The reaction yielded 4.32 lbs. (1.96 kg) solid and 3.82 lbs. (1.73 kg) condensate. See Table 3 below.

TABLE 3

| Particle size | Tare | Fractions | Inher. Visc. | Distribution | |
|---|---|---|---|---|---|
| [μm] | [g] | [g] | [dL/g] | [g] | [%] |
| >1400 | 330.3 | 333.7 | 0.5737 | 3.4 | 6.7 |
| 1180–1400 | 321.5 | 323.5 | 0.6071 | 2.0 | 4.0 |
| 1000–1180 | 314.6 | 317.2 | 0.5707 | 2.6 | 5.2 |
| 710–1000 | 305.2 | 309.6 | 0.6118 | 4.4 | 8.7 |
| 425–710 | 278.8 | 285.6 | 0.5705 | 6.8 | 13.5 |
| 355–425 | 270.0 | 272.8 | 0.5742 | 2.8 | 5.6 |
| 300–355 | 272.5 | 274.8 | 0.5712 | 2.3 | 4.6 |
| 150–300 | 249.4 | 258.6 | 0.5677 | 9.2 | 18.3 |
| 0–150 | 327.1 | 344.0 | 0.4982 | 16.9 | 33.5 |
| | | | $\bar{x}$ = 0.5513 | Σ = 50.4 | Σ = 100.0 |

Example 3

Same monomer weights used and vessel charged at ambient temperature. Vacuum was pulled and the vessel was swept with N2. The pressure was then set at atmospheric (2-3 inches $H_2O$ positive, 5.1-7.6 cm $H_2O$ positive), agitator at 18 rpm, and $N_2$ flow at 3 SCFH (standard cubic feet per hour) or 1.42 SLPM (standard liters per minute). The heater was set for 343° C. (max). A sample was taken at ~290° C. (yellow/gold color). The ramp time to 335° C. was 1 hr. 50 min. A sample (light brown color) was taken ~10 min. after reaching 335° C. (sampling line plugged; $N_2$ still flowing). Samples were also taken after 2 hours (light brown) and after 4 hours (dark brown to black; sampling container lost seal after the 2-hr sample). The reaction yielded 4.14 lbs. (1.88 kg) solid and 4.04 lbs. (1.83 kg) condensate. The post-cool product indicated of air exposure during the 2-4 hr. reaction period. See Table 4 below for the data of the 2-hr reaction, before the unwanted air exposure.

TABLE 4

| Particle size | Tare | Fractions | Inher. Visc. | Distribution | |
|---|---|---|---|---|---|
| [μm] | [g] | [g] | [dL/g] | [g] | [%] |
| >1400 | 330.3 | 331.7 | 0.5611 | 1.4 | 8.7 |
| 1180–1400 | 321.5 | 322.2 | 0.0000 | 0.7 | 4.3 |
| 1000–1180 | 314.6 | 315.5 | 0.5540 | 0.9 | 5.6 |
| 710–1000 | 305.2 | 306.8 | 0.5572 | 1.6 | 9.9 |
| 425–710 | 278.8 | 281.5 | 0.5548 | 2.7 | 16.8 |
| 355–425 | 270.0 | 270.9 | 0.5366 | 0.9 | 5.6 |
| 300–355 | 272.5 | 273.3 | 0.5495 | 0.8 | 5.0 |
| 150–300 | 249.4 | 252.2 | 0.5114 | 2.8 | 17.4 |
| 0–150 | 327.1 | 331.4 | 0.4649 | 4.3 | 26.7 |
| | | | □ = 0.5228 | Σ = 16.1 | Σ = 100.0 |

Example 4

The vessel was charged with 2.00 lbs. (0.91 kg) TAB and 2.98 lbs. (1.35 kg) DPIP. Vacuum was pulled and maintained at 9 inches Hg (22.9 cm Hg), agitation at 18 rpm, and 3 SCFH (standard cubic feet per hour) or 1.42 SLPM (standard liters per minute) $N_2$ flow. The first reaction at 290° C. was held for 30 min. The vacuum was then removed and the pressure increased to 3 inches $H_2O$ positive (7.6 cm $H_2O$ positive), and the vessel was heated to the maximum temperature of ~335 C. Samples were taken at the beginning of the 290° C. hold (gold-colored, wet sand consistency), at the end of the 290° C. hold (tan colored), after 2 hours at 335° C. (tan to light brown in color), and after 5 hours at 335° C. (light brown in color). The final product was light brown in color and 2.02 lbs. (0.92 kg) of material (vs. 2.87 lbs. (1.30 kg) theoretical) was recovered. See Table 5 below.

TABLE 5

| Particle size | Tare | Fractions | Inher. Visc. | Distribution | |
|---|---|---|---|---|---|
| [μm] | [g] | [g] | [dL/g] | [g] | [%] |
| >1400 | 330.3 | 333.3 | 0.7284 | 3.0 | 6.0 |
| 1180–1400 | 321.5 | 322.7 | 0.8204 | 1.2 | 2.4 |
| 1000–1180 | 314.6 | 316.7 | 0.7727 | 2.1 | 4.2 |
| 710–1000 | 305.2 | 310.1 | 0.7806 | 4.9 | 9.7 |
| 425–710 | 278.8 | 288.4 | 0.7307 | 9.6 | 19.1 |
| 355–425 | 270.0 | 273.4 | 0.7254 | 3.4 | 6.8 |
| 300–355 | 272.5 | 275.5 | 0.7073 | 3.0 | 6.0 |
| 150–300 | 249.4 | 260.6 | 0.6720 | 11.2 | 22.3 |
| 0–150 | 327.1 | 339.0 | 0.5966 | 11.9 | 23.7 |
| | | | $\bar{x}$ = 0.6928 | Σ = 50.3 | Σ = 100.0 |

Samples and products were tested for IV (and IV vs. particle size distribution), PV (plugging value, or filterability), L color, gel level, and by GPC (Gel Permeation Chromatography) for molecular weight distribution and NMR (Nuclear Magnetic Resonance) spectroscopy.

Gels can be defined as insoluble, deformable, polymer-like particles, most likely degraded or cross-linked polymer. PV is a solubility/filterability measure, vital for defining solution quality and subsequent fiber extrusion ability and quality. "L" color refers to the color level relative to whiteness on the color scale, the higher the value, the lighter color appearance. NMR, or nuclear magnetic resonance, (deleted a phrase), was used to monitor the molecular structure of the products. Polymer samples and products were tested by these and other methods to further characterize the polymer produced, the chemical and physical properties, and to further characterize the products as polybenzimidazole.

What is claimed is:

1. A process for a single-stage melt polymerization for the production of a polybenzimidazole which comprises the steps of:
    providing a reaction vessel having a means for agitation and a means for vacuum;
    charging said reaction vessel with reactants selected from: (A) a tetraaminiobiphenyl (TAB), and (B) a diphenyl isophthalate DPIP;
    reacting said reactants under constant agitation and under a vacuum with an inert gas sweep;
    maintaining a reactant temperature which does not exceed 290° C. under constant agitation allowing pressure in the vessel to increase with an inert gas sweep until a phase change is achieved, when the temperature reaches 250° C. pressure is increased to a slight positive pressure; and
    increasing said reactant temperature and pressuxe within said reaction vessel while maintaining constant agitation and inert gas sweep, while maintaining a slight positive pressure.

2. The process for a singlestage melt polymerization for the production of polybeozimidazole according to claim 1, where in the step of reacting said reactants under constant agitation and under a vacuum with an inert gas sweep is performed in the absence of either an organosilicon halide polymerization catalyst or a phosphorous containing polymerization catalyst or both an organosilicon halide polymerization catalyst and a phosphorous containing polymerization catalyst.

3. The process for a single-stage melt polyntorization for the production of polybenzmidazole according to claim 1, where said reaction vessel is a high intensity reaction vessel.

4. The process for a single-stage melt polymerization for the production of polybenzimidazole according to claim 1, where in the step of reacting said reactants under constant agitation and under a vacuum with an inert gas sweep is performed without producing any appreciable foam.

5. The process for a single-stage melt polymerization for the production of polybentimidazole according to claim 1, where inherent viscosity of the resulting polybenzimidazoie is in the range of 0.40 to 0.80 dL/g for particle sizes greater than or equal to 150 microns to less than or equal to 1000 microns.

6. The process for a single-stage melt polymerization for the production of polybenzimidazole according to claim 1, where the resulting polybenzimiclazole has a bright yellowish gold color.

7. The process for a single-stage melt polymerization for the production of polybenzimidazole according to claim 1, where a slight positive pressure is between or equal to 0.1 mbar to 500 mbar.

8. The process for a single-stage melt polymerization for the production of polybenzimidazole according to claim 7, where a slight positive pressure is between or equal to 0.5 mbar to 300 mbar.

9. The process for a single-stage melt polymerization for the production of polybenzimidazole according to claim 7, where a slight positive pressure is between or equal to 1 mbar to 100 mbar.

10. The process for a single-stage melt polymerization for the production of polybenzimidazole according to claim 1, where the vacuum is between or equal to 12.7 cm of mercury to 38.1 cm of mercury at a temperature of between or equal to 20 degrees to 25 degrees centigrade.

11. The process for a single-stage melt polymerization for the production of polybenzimidazole according to claim 1, where the polybeazimidazole exhibits uniform inherent viscosity values throughout the particle size distribution range.

12. The process for a single-stage melt polymerization for the production of polybenzimidazole according to claim 1, where the vacuum is between or equal to 169 to 508 millibars at a temperature of between or equal to 20 degrees to 25 degrees centigrade.

13. The process for a single-stage melt polymerization for the production of polybenzimidazole according to claim 1, where the polybentimidazole exhibits inherent viscosity values for particles sized from greater than or equal to 150 microns to less than or equal to 1000 microns which do not very more than 0.16 dL/g.

14. The process for a single-stage melt polymerization for the production of polybenzimidazole according to claim 1, where (A) a tetraaminiobiphenyl (TAB), is 3, 3', 4, 4'-tetraaminobiphenyl.

15. The process for a single-stage melt polymerization for the production of polybenzimidazole according to claim 1, where (B), a diphenyl isophthalate (DPIP), is selected from the group consisting of: 1, 3-benzene dicarboxylic acid, diphenyl ester.

16. A process for a single-stage melt polymerization for the production of a polybenzimidazole which comprises the steps of:

providing a reaction vessel having a means for agitation and a means for vacuum;

charging said reaction vessel with reactants selected from: (A) a tetraaminobiphenyl (TAB), and (B) a diphenyl isophthalate DPIP;

reacting said reactants under constant agitation and under a vacuum, between or equal to 12.7 cm of mercury to 38.1 cm of mercury at a temperature of between or equal to 20 degrees to 25 degrees centigrade, with an inert gas sweep;

maintaining a reactant temperature which does not exceed 290° C. under constant agitation allowing pressure in the vessel to increase with an inert gas sweep until a phase change is achieved, when the temperature reaches 250° C. pressure is increased to a slight positive pressure, between or equal to 0.1 mbar to 500 mbar;

increasing said reactant temperature and pressure within said reaction vessel while maintaining constant agitation and inert gas sweep, while maintaining a slight positive pressure; and where inherent viscosity of the resulting polybenzimidazole is in the range of 0.40 to 0.90 dL/g for particle sizes greater than or equal to 150 microns to less than or equal to 1000 microns.

17. The process for a single-stage melt polymerization for the production of polybentimidazole according to claim 16, where in the step of reacting said reactants under constant agitation and under a vacuum with an inert gas sweep is performed in the absence of either an organosilicon halide polymerization catalyst or a phosphorous containing polymerization catalyst or both an organosilicon halide polymerization catalyst and a phosphorous containing polymerization catalyst.

18. The process for a single-stage melt polymerization for the production of polybenzimidazole according to claim 16, where the polybenzimidazole exhibits inherent viscosity values for particles sized from greater than or equal to 150 microns to less than or equal to 1000 microns which do not vary more than ±0.10 dL/g.

19. The process for a single-stage melt polymerization for the production of polybenzimidazole according to claim 1, where said reaction vessel is a high intensity reaction vessel selected from the group consisting of: rotary furnace, fluidized bed, static mixing, continuous kneader reactor, opposite rotating processor, same direction rotating processors and single shaft rotating processor.

20. The process for a singlestage melt polymerization for the production of polybenzimidazole according to claim 3, where said high intensity reaction vessel is selected from the group consisting of: rotary furnace, fluidized bed, static mixing, continuous kneader reactor, opposite rotating processor, same direction rotating processors and single shaft rotating processor.

* * * * *